United States Patent [19]

Lee et al.

[11] Patent Number: 4,730,150
[45] Date of Patent: Mar. 8, 1988

[54] D.C. MULTI-PHASE BI-POLAR BRUSHLESS MOTOR

[75] Inventors: I S. Lee, Seoul; Jung S. Lee, Kyung Ki-Do, both of Rep. of Korea

[73] Assignee: Woo Y. Choi, San Diego, Calif.

[21] Appl. No.: 843,273

[22] Filed: Jun. 6, 1986

[30] Foreign Application Priority Data

Aug. 20, 1985 [KR] Rep. of Korea ............... 85-6014

[51] Int. Cl.⁴ ........................................ H02K 29/08
[52] U.S. Cl. ................................. 318/254; 318/138
[58] Field of Search ................. 318/138, 254, 439; 310/68 R

[56] References Cited

U.S. PATENT DOCUMENTS

| 4,283,664 | 8/1981 | Ebert | 318/254 A X |
| 4,353,016 | 10/1982 | Born | 318/254 |
| 4,417,186 | 11/1983 | Hirose et al. | 318/254 |
| 4,484,115 | 11/1984 | Takahashi | 318/254 |

FOREIGN PATENT DOCUMENTS

| 57-88886 | 6/1982 | Japan | 318/254 |
| 58-36159 | 3/1983 | Japan | 318/254 |
| 58-215989 | 12/1983 | Japan | 318/254 |
| 60-141184 | 7/1985 | Japan | 318/254 |
| 2102222 | 1/1983 | United Kingdom | 318/254 |

Primary Examiner—Bentsu Ro
Attorney, Agent, or Firm—Brown, Martin, Haller & Meador

[57] ABSTRACT

A D.C. multi-phase brushless motor having M phase stator windings and an N pole rotor, with M and N being integers, a sensor for sensing rotor position and providing rotor position signals to a motor controller is disclosed. The sensor comprises a circular permanent magnet, mounted externally to a motor at one end of a rotor with the magnet having N poles, and M sets of paired Hall effect devices, mounted adjacent the magnet, wherein each of the M sets of paired Hall effect devices are mounted in adjustable relationship to the magnet with respect to radial and angular distance. The sensor is mounted within a housing mounted externally to an end of a motor adjacent the rotor end having the magnet mounted thereon with the M sets of paired Hall effect devices mounted within and upon the housing in adjustable relationship with the magnet.

5 Claims, 16 Drawing Figures

ONE PHASE TORQUE RIPPLE

2 PHASE TORQUE RIPPLE

3 PHASE TORQUE RIPPLE

2 PHASE 1 COIL TORQUE RIPPLE

3 PHASE 2 COIL TORQUE RIPPLE

4 PHASE 3 COIL TORQUE RIPPLE

D.C. MULTI-PHASE BI-POLAR BRUSHLESS MOTOR

BRIEF DESCRIPTION OF THE DRAWINGS

The features, object and advantages of the invention will be more fully apparent from the detailed description set forth below taken in conjunction with the drawings in which like reference characters identify corresponding throughout and wherein:

FIG. 1-B, Three Phase 12 Stator Windings Motor.

FIG. 1-C, The Permanent Magnet for the Motor Position. Sensing and the Position of Sensors.

SUMMARY OF THE INVENTION

This invention is the Improved Version of the D. C. Bi-Polar Brushless Motor that uses sinusoidal type which is generally well known as the most idealistic type of D. C. Brushless Motor type even with its required complex operating circuit, poor torque ripple, low efficiency and relatively high manufacturing cost compared with the other known D. C. Brushless Motors like Trapezoidal Torque Function Type.

This invention made a great deal of improvement regarding the said faults (the complex running circuit, poor torque ripple, low efficiency and relatively high manufacturing cost) by setting up the rotor pole position sensing part at the end of the rotor shaft as an external type with small circular permanent magnet placed together with the same number sets of the Hall effect devices, which is set to be adjustable for both radian and the sensing distance in relationship to the rotor position and pole sensing permanent magnet. The result:

Improved torque ripple, simplification of the operating circuit, easiness of multi-phasing, and relative low cost to manufacture from micro motor to power motor.

DETAILED DESCRIPTION OF THE PREFERRED EMBODIMENTS

Figure 1A:
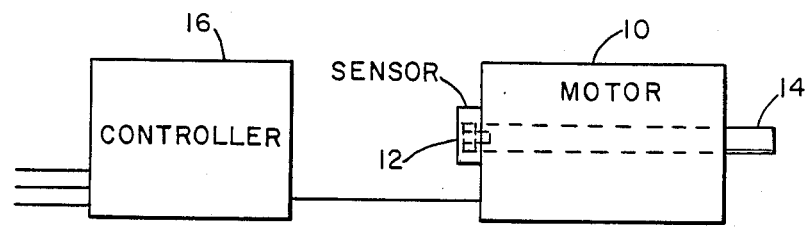
FIG. 1-A, The Motor with Controller.
Figure 1B:
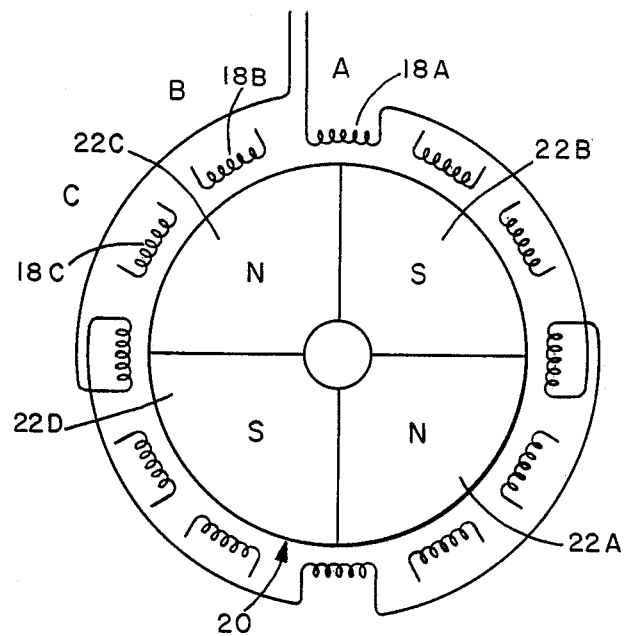
Figure 1C:
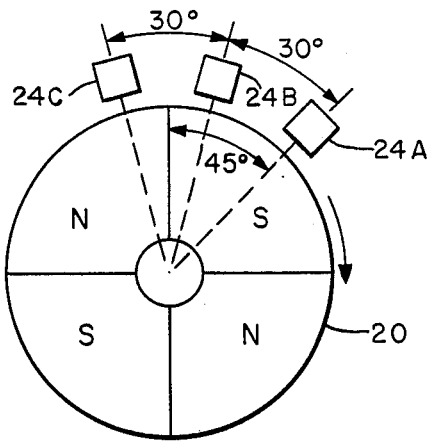

1. Construction of the motor 10, an exemplary three phase (phases A, B and C) four pole motor with 12 stator windings 18 (four stator windings 18A corresponding to phase A, 18B for phase B and 18C for phase C) and sensing part 12 as shown in the FIGS. 1A-1C, at the end of the rotor shaft 14, sensing part 12 is attached and it consists of permanent magnet 20 with same number of poles 22 (four in this case) as the rotor poles and sensors 24A, 24B and 24C each having a pair of Hall effect devices with each sensor are installed independently for each phase, phases A, B and C (with sensors 24A, 24B and 24C respectively corresponding to phases A, B and C) and have the feature to make necessary adjustment for sensing distance and radian.

Figure 2A:
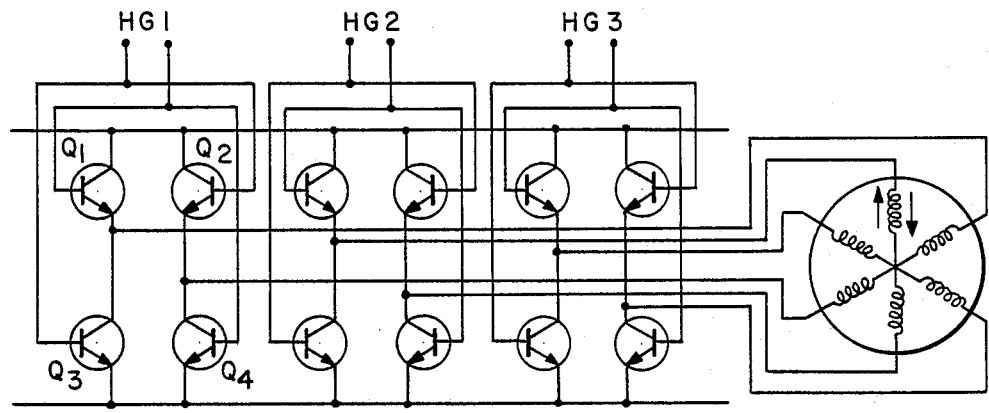
FIGS. 2A and 2B, The Operating Circuit for the Motor (3 Phase 6 Poles with 2 Pole Rotor).
Figure 2B:
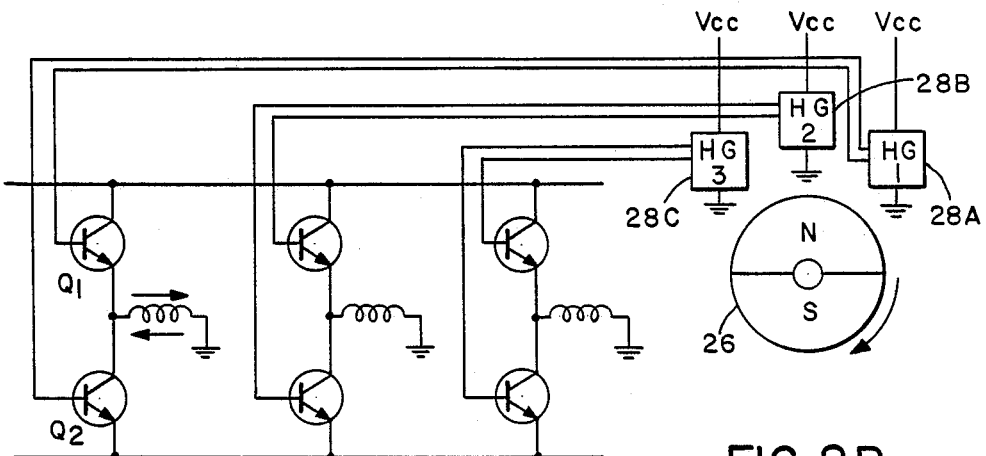

2. Circuit for sensing part 12 and motor 10 shown in the FIG. 2A, for the simplicity of the explanation, in a single phase as illustrated in FIG. 2B, a set of two Hall effect devices in sensor 28A will sense either N or S of the sensing permanent magnet 26 and will trigger Transistor Q1, Q4 by one and Transistor Q2, Q3 by the other independently and thereby this system made it unnecessary to have sensing signal separator or cross-fire prevention interlocks needed by other types of D. C. Brushless motors.

Figures 1, 3A:
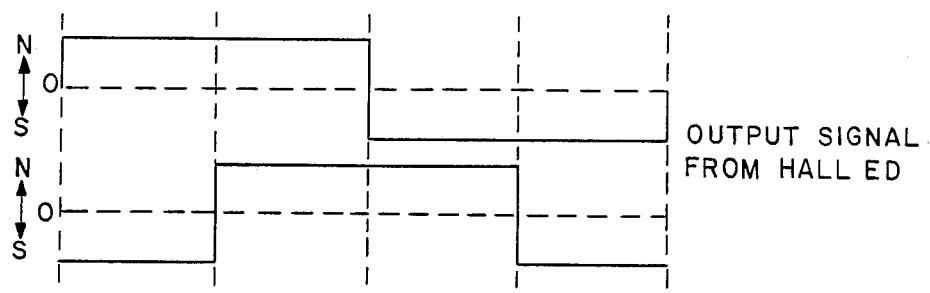
FIG. 3A, Shows the Aggregate of the Positive and Negative Torque.
Figures 2, 3A:
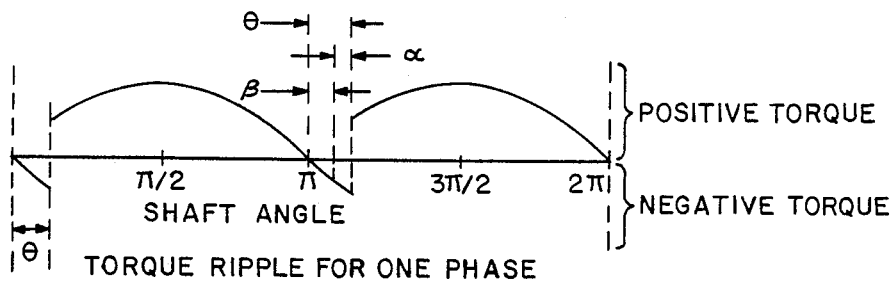
Figures 3, 3A:
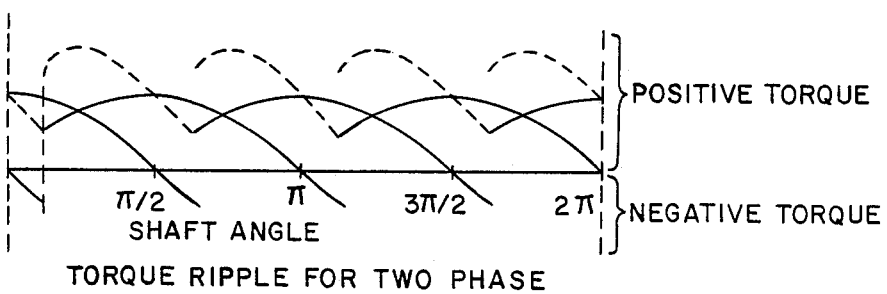
Figures 1, 3B:
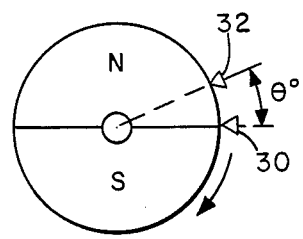
FIGS. 3B and 4A, The Aggregate of the Torque Ripple.
Figures 2, 3B:
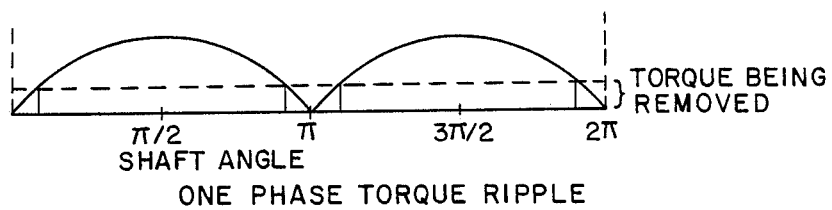
Figures 3, 3B:
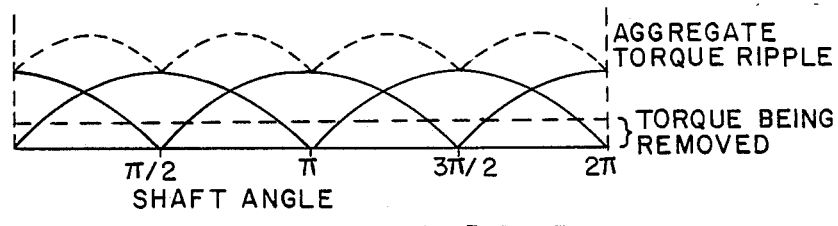
Figures 3, 3B, 4:
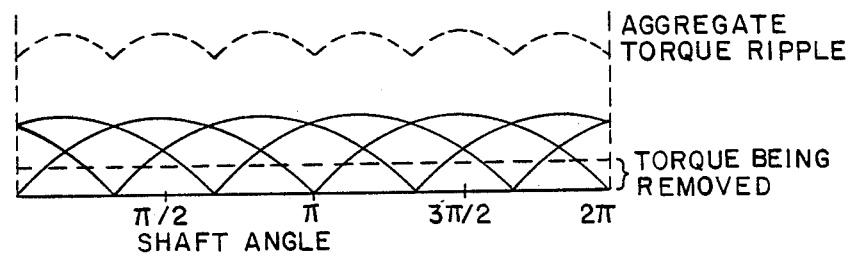

3. Advance positioning of Hall effect devices in their radian. The signal, illustrated in FIG. 3A-1, that is picked from the Hall effect device in the mechanical position (theoretical position), point 30 as illustrated in FIG. 3B-1, lags $\alpha°$ in the process of developing torque when you compare the mechanical operating and release points with the torque starting and ending points. On top of that, operating point of the Hall effect device comes at much higher gauss than release point, that causes the beginning and ending torque point to be retarded by $\beta°$. This leaves an area to have reverse torque. So, when Hall effect devices are installed in line with the rotor, the torque ripple will show as FIGS. 3A-2 and 3A-3, and results $\theta°$ $(\alpha°+\beta°)$ lagging and shows section for negative torque and that makes poor torque ripple and bad efficiency. That is the reason why the sensors are needed to position $\theta°$ $(\alpha°+\beta°)$ in advance, point 32 in FIG. 3B-1. This makes the negative torque section to work as positive torque section. The result is improved torque ripple and efficiency. (In practice, there are sections that no torque occurs in the FIG. 3A-2, because the Hall effect devices do not work at the center of N pole and S pole.)

Figures 1, 4A:
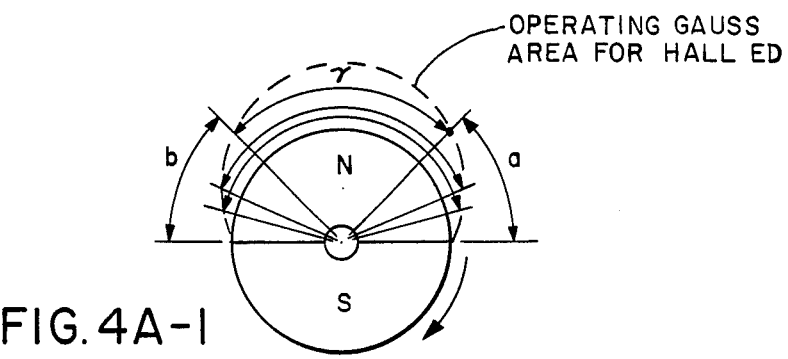
Figures 2, 4A:
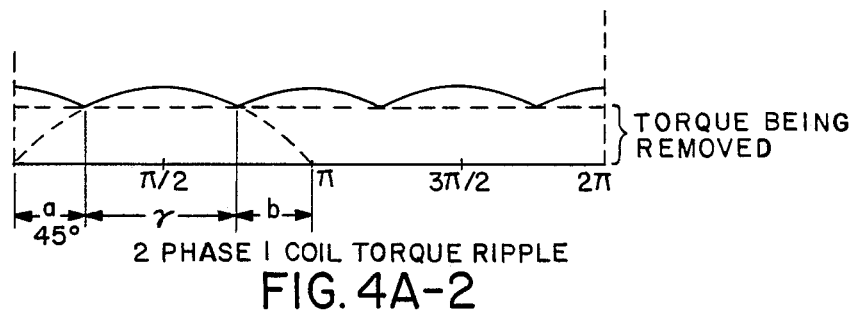
Figures 3, 4A:
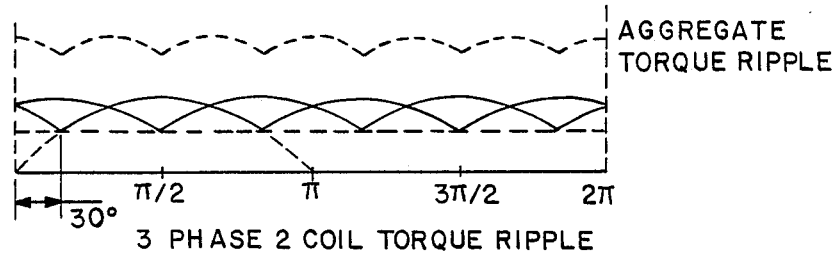
Figures 4, 4A:
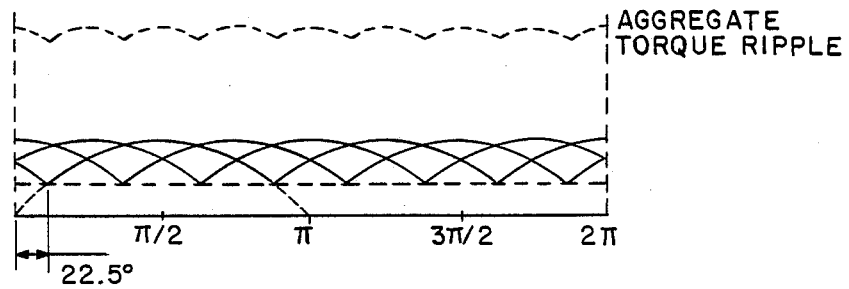

4. Adjusting the Hall effect device sensing distance as shown in FIG. 3B-1, this motor has positioned the sensors $\theta°$ $(\alpha°+\beta°)$ in advance and at the same time adjusting sensing distance for the Hall effect devices so that the low efficiency section (a+b in the FIG. 4A-1) would be eliminated. Result: improved efficiency and torque ripple (aggregate torque).

The effect of this invention (especially medium size or greater power motor)

The Character of the sensing part

Sensing part is made of non-conducting material and mounted at the end of the rotor shaft as an external type and consists of circular permanent magnet and Hall effect devices. It is easy to install and low cost to manufacture, is not affected by heat from the main motor or magnetic field, is capable to be free from contamination by foreign material like dust, it can be made to operate in the fluid (not with photo sensor) and it can be used in common either for medium size main motor or for larger size main motor.

Safety and simplicity of the operating circuit

Hall effect devices sense N, S separately and trigger its own particular transistors on and off independently. That makes no need for signal separating device or cross-fire prevention interlocks. So the motor circuit is simple and safe.

Elimination of the Negative torque

By positioning Hall effect devices properly, negative torque has been completely eliminated. Substantial improvement in the torque ripple and maximize the efficiency. By adjusting the distance of the Hall effect devices to meet the requirement of the given motor needs, this motor achieved substantial improvement in the torque ripple and maximized the efficiency by eliminating and modulating the poor torque section.

What is claimed is:

1. A bi-polar brushless d.c. motor comprising:
a stator having M phase windings;
an N pole rotor rotatably coupled to said stator;

a circular permanent magnet mounted at one end of said rotor, said magnet having N poles;

M sets of paired Hall effect devices, each Hall effect device in each set of paired Hall effect devices positioned adjacent one another and each set of paired Hall effect devices positioned, with respect to radial and angular distance, adjacent the periphery of said magnet and each Hall effect device in each set of paired Hall effect devices alternately generating spaced apart control signals in response to the angular position of said magnet;

circuit means coupled to said stator M phase windings and said M sets of paired Hall effect devices for receiving input d.c. power and responsive to said control signals for selectively coupling d.c. power to a predetermined one of said M phase windings.

2. The motor of claim 1 wherein said N pole rotor has at least one North and South pole pair, one Hall effect device of each one of said M sets of paired Hall effect devices generating a control signal in response to said magnet North pole and the other Hall effect device of each one of said M sets of paired Hall effect devices generating a control signal in response to said magnet South pole, said one and said other Hall effect devices of said one of said M sets of paired Hall effect devices positioned a predetermined radial distance from the periphery of said magnet North and South poles.

3. The motor of claim 2 wherein each of said M sets of paired Hall effect devices are positioned a predetermined angular distance from the boundary of said magnet North and South poles.

4. The motor of claim 3 wherein said magnet poles are positioned in-line with said rotor poles.

5. The motor of claim 1 wherein each of said M sets of paired Hall effect devices are positioned a predetermined angular distance from the boundary of said magnet North and South poles.

* * * * *